(12) United States Patent
Vaidya et al.

(10) Patent No.: US 7,346,787 B2
(45) Date of Patent: Mar. 18, 2008

(54) SYSTEM AND METHOD FOR ADAPTIVE POWER MANAGEMENT

(75) Inventors: Priya N Vaidya, Shrewsbury, MA (US); Premanand Sakarda, Acton, MA (US); Bryan C Morgan, Leominster, MA (US); Yi Ge, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 11/006,917

(22) Filed: Dec. 7, 2004

(65) Prior Publication Data
US 2006/0123252 A1  Jun. 8, 2006

(51) Int. Cl.
*G06F 1/00* (2006.01)

(52) U.S. Cl. .................. 713/300; 713/322; 713/324

(58) Field of Classification Search ........... 713/300, 713/322, 324; 700/50
See application file for complete search history.

(56) References Cited

U.S. PATENT DOCUMENTS

| | | | | |
|---|---|---|---|---|
| 4,601,008 A | * | 7/1986 | Kato | 710/260 |
| 5,630,148 A | * | 5/1997 | Norris | 713/322 |
| 5,765,209 A | * | 6/1998 | Yetter | 711/207 |
| 6,092,180 A | * | 7/2000 | Anderson et al. | 712/200 |
| 6,895,520 B1 | * | 5/2005 | Altmejd et al. | 713/324 |
| 2005/0049729 A1 | * | 3/2005 | Culbert et al. | 700/50 |

OTHER PUBLICATIONS

Gao et al Patent Application Filed Dec. 7, 2004—System and Method for Adaptive Power Management.

www.intel.com/cd/ids/developer/asmo-na/eng/microprocessors/pca/knowledgebase/169101.htm—How to Use the System Utility to Configure the PMU on Intel PCA.

ftp://download.intel.com/design/pca/applicationsprocessors/manuals/28000402.pdf—Intel PXA27x Processor Family Optimization Guide—Aug. 2004.

www.intel.com/design/pca/applicationsprocessors/whitepapers/30086901.pdf—Optimization Technology for the Intel PXA27x Processor Family—2004.

http://www.intel.com/design/iio/applnots/27366103.pdf—Performance Profiling Techniques on Intel Xscale Microarchitecture Processors.

www.acpi.info/presentations/ACPI_overview.pdf—ACPI OVERVIEW.

ftp://download.intel.com/pca/developernetwork/doc/25179701.pdf—Intel PCA Power Management Software Design Guide—Sep. 4, 2002.

(Continued)

*Primary Examiner*—Suresh K Suryawanshi
(74) *Attorney, Agent, or Firm*—Michael R. Barre

(57) ABSTRACT

A disclosed method involves initializing a performance profiler of a processing system. The performance profiler may include performance profile parameters for a power management policy for the processing system. The method also involves retrieving performance metrics for the processing system from a performance monitoring unit (PMU) of the processing system, in response to a determination that performance details should be collected. A current performance state of the processing system may be determined, based at least in part on the performance profile parameters and the performance metrics from the PMU. The current performance state may then be communicated to a policy manager of the processing system. Other embodiments are disclosed and claimed.

27 Claims, 6 Drawing Sheets

OTHER PUBLICATIONS www.intel.com/design/pca/applicationsprocessors/whitepapers/30057701.pdf—Wireless Intel Speedstep Power Manager—2004.
www.mvista.com/dswp/ds_cee.pdf—Montavista Linux Consumer Electronics Edition 3.1.
ftp:??download.intel.com/design/pca/applicationsprocessors/schems/27887706.pdf—Intel XPA27X Processor Reference Platform (Rev.1.4)—Jun. 2004.

* cited by examiner

SYSTEM AND METHOD FOR ADAPTIVE POWER MANAGEMENT

FIELD OF THE INVENTION

The present disclosure relates generally to the field of data processing, and more particularly to power management in a processing system.

BACKGROUND

Many purchasers, users, and manufacturers of computer products are becoming increasingly sensitive to issues of power consumption. In some cases, consumers desire to lower their energy bills. Consumers may also prefer processing systems that generate less noise and heat, and there is typically a positive relationship between the amount of power consumed by a processing system and the amounts of noise and heat generated by that processing system. In addition, for a battery powered processing system such as a laptop computer, a cellular telephone ("cell phone"), a personal digital assistants (PDAs), etc., reducing the power consumption has the valuable effect of increasing the processing system's battery life (i.e., increasing the amount of time the processing system can be used before the battery must be recharged or replaced with a fresh battery).

A typical processing system includes many different components, such as a processor or microprocessor, a data storage device, and various input/output (I/O) devices. When a processing system is not off, each component within the processing system may consume some power. The terms "system power state" and "global power state" both refer to the aggregate power consumption of all of the components in a processing system. The term "device power state" refers to the power consumption of a particular component. Typically, the processor is one of the most significant consumers of power in a processing system. The term "processor power state" refers specifically to the power consumption of a processor or microprocessor.

Available publications discuss various aspects of power management for processing systems. For instance, revision 2.0c of the Advanced Configuration and Power Interface Specification, dated Aug. 25, 2003, (hereinafter the "ACPI specification") may be obtained from the Internet at www.acpi.info/spec.htm. The ACPI specification describes various global power states and device power states that may be implemented in a processing system to support power management. Also, revision 1.0 of the Intel® PCA Power Management Software Design Guide, dated Sep. 2, 2002, (hereinafter the "Intel Design Guide") may be obtained from the Internet at ftp://download.intel.com/pca/developernetwork/doc/25179701.pdf. The Intel Design Guide contains information on how to obtain power savings for processing systems that employ an architecture known as Intel® Personal Internet Client Architecture (PCA).

One approach to managing performance is to use a static prediction of performance needs. For instance, a developer of an end user application may initially determine through experimentation that certain functions or tasks of the application typically require a certain amount of processing power. The result of the experimentation may be considered static profiling information. The developer may then design the application to modify the performance level of the processing system before executing those functions or tasks. Such a software application thus manages the system performance based on the predicted needs.

Also, an operating system (OS) may schedule and run software entities such as processes, threads, and tasks, and the scheduler in the OS may include an application programming interface (API) that provides loading information pertaining to those processes, threads, and tasks. Other software programs can call that API to retrieve the loading information. The loading information may include, for instance, the total number of active processes, threads, and tasks. The programs that may obtain loading information from the OS scheduler may include power management software or debugging software, for example.

Static techniques for managing power present many disadvantages. For example, in a typical case, development of the software application will be made more difficult, because expected processing power requirements must be predicted by the developer, based on the previous analysis done, and then handled within the application. Furthermore, the predicted processing power requirements may differ substantially from the actual processing power requirements. Also, when a developer is attempting to design an application to handle the expected processing power requirements, the tools available for that application for modifying the system's performance level may be limited to the tools provided by a particular OS. This same limitation may apply to programs that obtain loading information from an OS API.

BRIEF DESCRIPTION OF THE DRAWINGS

The features and advantages of the present invention will become apparent from the appended claims and the following detailed description of one or more example embodiments, in which:

DETAILED DESCRIPTION

Intel Corporation manufactures processors that incorporate technologies to support low power consumption and high performance processing for a wide range of services. In some cases, the technologies in those processors for supporting low power consumption and high performance processing may be referred to in general as Intel XScale® technology. Intel Corporation currently distributes one or more families of processors that feature Intel XScale® technology under various product designations or model numbers, such as the Intel® PXA26x and the Intel® PXA27x product families.

Example embodiments illustrated herein may include processing systems with processors that support Intel® PCA. Alternative embodiments of the present invention include processing systems with other kinds of processors, whether manufactured by Intel Corporation or other manufacturers. As described in greater detail below, the example embodiment includes a processor with dynamic voltage management (DVM) and dynamic frequency management (DFM) capabilities.

Figure 1:
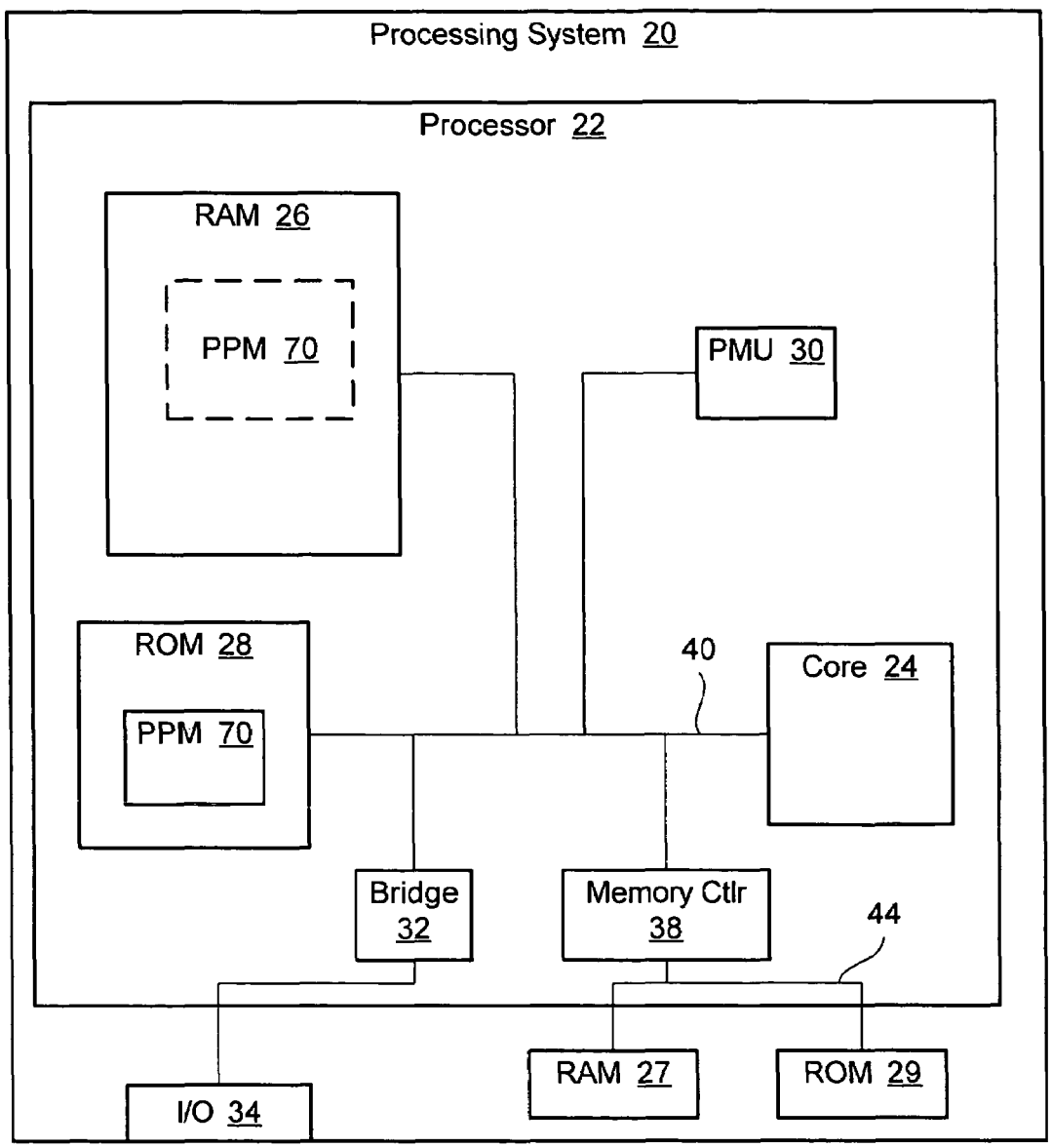
FIG. 1 is a block diagram depicting an example embodiment of a suitable data processing environment in which certain aspects of an example embodiment of the present invention may be implemented.
Figure 1:
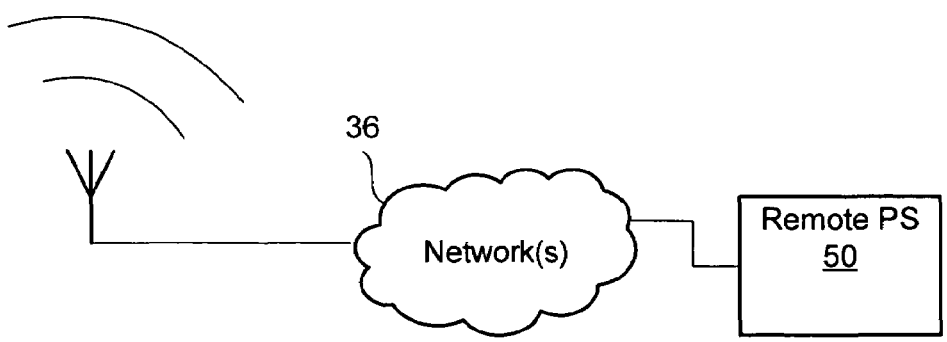

FIG. 1 is a block diagram depicting an example embodiment of a suitable data processing environment in which certain aspects of an example embodiment of the present invention may be implemented. FIG. 1 and the following discussion are intended to provide a general description of a suitable environment in which certain aspects of the present invention may be implemented. As used herein, the terms "processing system" and "data processing system" are intended to broadly encompass a single machine, or a system of communicatively coupled machines or devices operating together. Exemplary processing systems include, without limitation, distributed computing systems, supercomputers, computing clusters, mainframe computers, mini-computers, client-server systems, personal computers, workstations, servers, portable computers, laptop computers, tablet processing systems, telephones, personal digital assistants (PDAs), handheld devices, mobile handsets, entertainment devices such as audio and/or video devices, and other devices for processing or transmitting information.

The data processing environment of FIG. 1, for example, may include a processing system 20 that includes one or more processors or central processing units (CPUs) 22 communicatively coupled to various other components via one or more buses or other communication conduits or pathways. CPU 22 may be implemented as an integrated circuit. The components coupled to CPU 22 may include one or more volatile or non-volatile data storage devices, such as random access memory (RAM) 27 and read-only memory (ROM) 29. A memory bus 44 may serve to couple RAM 27 and ROM 29 with CPU 22. For purposes of this disclosure, the term "ROM" may be used in general to refer to non-volatile memory devices such as erasable programmable ROM (EPROM), electrically erasable programmable ROM (EEPROM), flash ROM, flash memory, etc. CPU 22 may also be communicatively coupled to mass storage devices, such as one or more integrated drive electronics (IDE) drives, small computer systems interface (SCSI) drives, or other types of hard disk drives. Other types of mass storage devices and storage media that may be used by processing system 20 may include floppy disks, optical storage, tapes, memory sticks, digital video disks, biological storage, etc.

The components of processing system 20 that are communicatively coupled to processor 22 may also include one or more bus bridges. One or more of those bridges and associated buses may be used to connect processor 22, either directly or indirectly, with additional components, such as one or more storage devices, device controllers, input/output (I/O) ports, and I/O devices 34. For example, the additional components may include a video controller, a SCSI controller, a network controller, a universal serial bus (USB) controller, a keyboard controller, etc. In some embodiments, such components may be implemented as embedded devices, using components such as programmable or non-programmable logic devices or arrays, application-specific integrated circuits (ASICs), embedded computers, smart cards, and the like.

In some embodiments, processor 22 may be implemented as an integrated circuit (IC) that includes a processing core 24, as well as control circuits or control logic for implementing additional components. Such components may include an on-chip bus bridge 32, on-chip RAM 26, on-chip ROM 28, a performance monitoring unit (PMU) 30, and a memory controller 38. The IC may also feature one or more internal bus bridges and/or internal buses, such as system bus 40, for interconnecting various components within processor 22.

Processing system 20 may be controlled, at least in part, by input from conventional input devices, such as a keyboard or keypad, a pointing device, etc., and/or by directives received from one or more remote data processing systems 50, interaction with a virtual reality (VR) environment, biometric feedback, or other input sources or signals. Processing system 20 may send output to components such as a display device, remote data processing system 50, etc. Communications with remote data processing system 50 may travel through any suitable communications medium. Processing systems may be interconnected by way of a physical and/or logical network 36, such as a local area network (LAN), a wide area network (WAN), an intranet, the Internet, a public switched telephone network (PSTN), a cellular telephone network, etc. Communications involving network 36 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including instructions, functions, procedures, data structures, application programs, etc. which when accessed by a machine result in the machine performing tasks or defining abstract data types or low-level hardware contexts. The data may be referred to in general as software, and it may be stored in volatile and/or non-volatile data storage.

For example, ROM 28 may include at least portions of a software application 70 for monitoring the performance of processing system 20 and managing the power consumption of processing system 20. Software application 70 may also be referred to as platform power manager (PPM) 70. In an example embodiment, PPM 70 may include instructions and other data for implementing the functionality described herein. As indicated by the dashed box in RAM 26, some or all of PPM 70 may be loaded into RAM 26, for example in connection with a boot process for processing system 20. In one embodiment, PPM 70 may then cause processing system to operate as described below. In alternative embodiments, processing system 20 may obtain PPM 70 from one or more other sources, such as ROM 29 and/or remote data processing system 50, and some or all of PPM 70 may be loaded into RAM 27.

Figure 2:
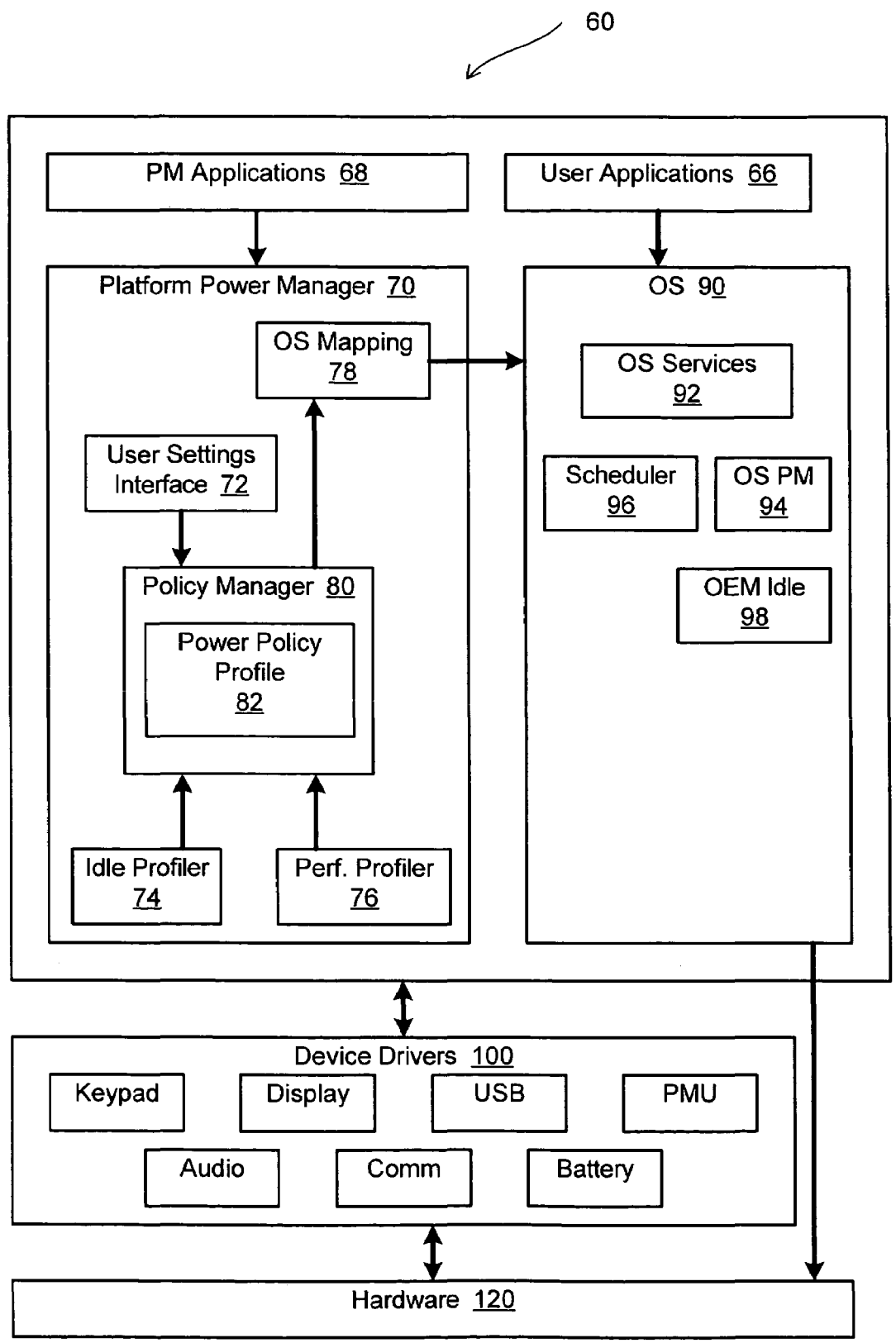
FIG. 2 is a block diagram depicting software components for managing power in a processing system, in accordance with an example embodiment of the present invention.

FIG. 2 is a block diagram of a power management architecture 60, in accordance with an example embodiment of the present invention. As illustrated, power management architecture 60 includes PPM 70, which, from a logical perspective, resides above the hardware 120 of processing system 20, and above the device drivers 100 which serve as low-level software interfaces to various hardware components.

In the example embodiment, power management architecture 60 also includes an operating system (OS) 90 and user applications 66. Power management architecture 60 may also include one or more power management applications 68 which interact with PPM 70, as described in greater detail below. OS 90 may include code for various OS services 92 and a task scheduler 96. OS 90 may also include power management (PM) software 94 for implementing certain power management features. In the example embodiment, OS 90 also includes a sequence of instructions for causing processing core 24 to enter and exit idle mode. Such a sequence of instructions may be referred to as original equipment manufacturer (OEM) idle code 98, idle execution path 98, or simply idle path 98.

In the example embodiment, task scheduler 96 keeps track of which processes or tasks are currently running, and OS 90 executes idle path 98 whenever no processes or tasks are ready to run. In the example embodiment, OS 90 uses a variable duration idle, which exits in response to an event such as an interrupt. In alternative embodiments, the OS can use a fixed duration idle. The present invention may also be used in systems that do not use a thread or other dispatchable entity to implement the idle path.

In the example embodiment, PPM 70 includes various modules for monitoring system performance, modifying system power consumption, and performing related functions. As described in greater detail below, those modules may include a power policy manager 80, a user settings interface 72, an idle profiler 74, a performance profiler 76, and an OS mapping module 78. Power policy manager 80 may also be referred to as policy manager 80. The different modules may communicate with each other through any suitable mechanisms, such as application programming interfaces (APIs) for example.

In the example embodiment, device drivers 100 register with PPM 70 through the device driver APIs. Consequently, device drivers 100 may receive notification from PPM 70 on all of the power management events, such as state transitions, frequency changes, and voltage changes. If a particular operating state is supported by OS 90, then PPM 70 may use the OS interface to notify device drivers 100. Otherwise, PPM 70 may use an independent interface between device drivers 100 and PPM 70. When a device driver receives a callback for a power management state transition or event, the device driver may transition into its new state and prepare the device for the next state. As an example, when a keypad driver transitions into a standby state, the keypad driver may configure the low-level registers so that the keypad driver can wakeup from standby state if the user presses the key on the keypad.

Device drivers 100 may also include logic for requesting a state change from PPM 70. For example, a battery driver may communicate with PPM 70 to request a reduced operating point for processing system 20, to reduce power consumption in response to determining that the charge level of the system's battery has fallen below a predetermined threshold.

PPM 70 may use its own services or services from OS 90 to dynamically scale power and performance. For example, if OS 90 supports two different performance modes identified as "run" and "idle," PPM 70 may use services of OS 90 to enter those performance modes. In addition, as described in greater detail below, PPM 70 may recognize or create additional performance modes, and PPM 70 may use its own services (e.g., services for communicating with PMU 30) to enter those modes.

OS mapping module 78 includes resources for interfacing with one or more individual OSs. OS mapping module 78 thus provides a layer of abstraction between policy manager 80 and OS 90. Consequently, PPM 70 may be used with a different OS by simply replacing OS mapping module 78, modifying OS mapping module 78, or using different resources of OS mapping module 78.

Figure 3:
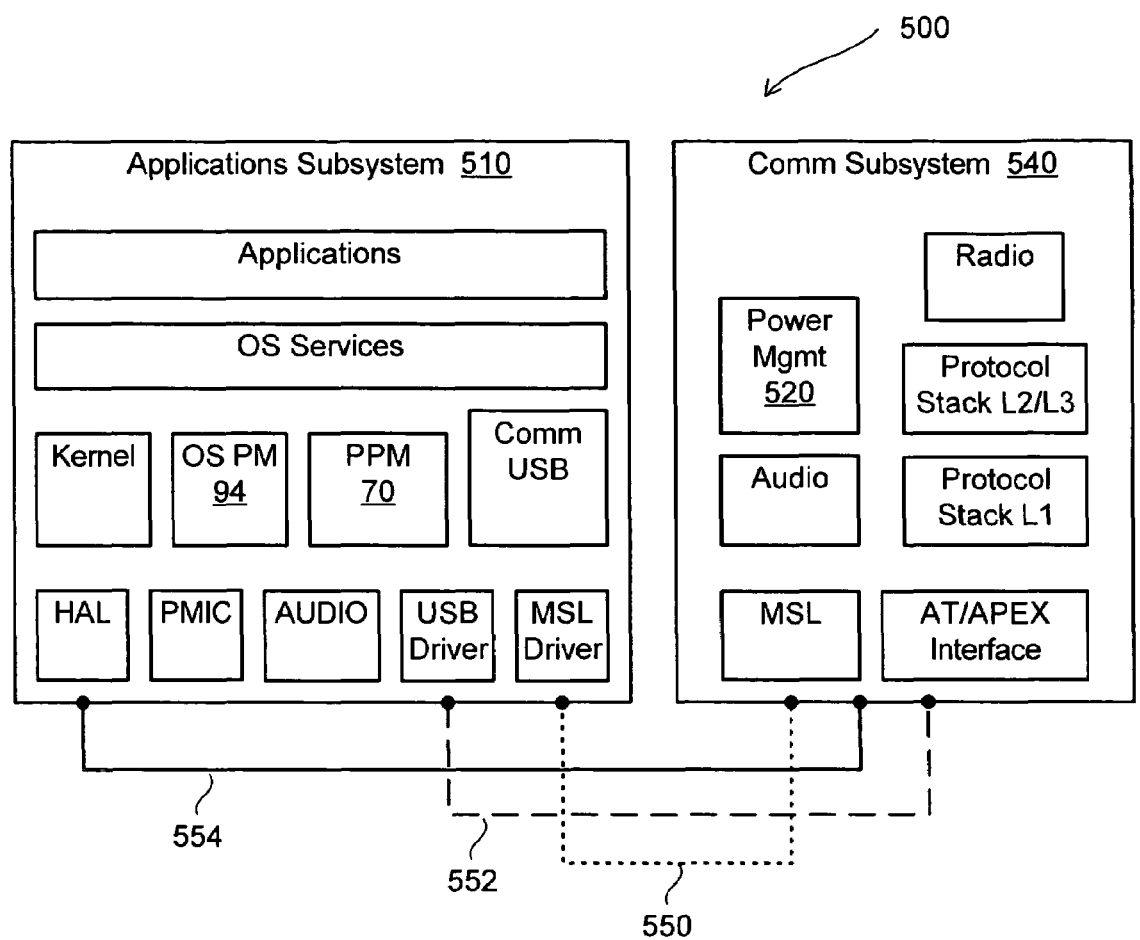
FIG. 3 is a block diagram depicting software and hardware components in a processing system with communications capabilities, in accordance with an example embodiment of the present invention.

FIG. 3 is a block diagram depicting software and hardware components in a processing system 500 with communications capabilities, in accordance with an example embodiment of the present invention. In particular, processing system 500 includes an applications subsystem 510 and a communications subsystem 540. Processing system 500 may also include a mobile scalable link (MSL) 550 to support communications between applications subsystem 510 and communications subsystem 540. Additional communication paths may also be provided, such as a serial link 552 and a serial small computer systems interface (SCSI) protocol (SSP) link 554.

Communications subsystem 540 may include various software components, such as a communications power management module (CPMM) 520, various protocol stack layers, and an MSL interface. CPMM 520 may handle power management for communications subsystem 540, and CPMM 520 may maintain its own state machine. CPMM 520 may interface to the different layers of the protocol stack. In addition, CPMM may support different power modes, such as a run duty cycle and a low power duty cycle, with different states for functions such as a global positioning system (GPS) and/or communications using technology such as a Global System for Mobile Communications (GSM) protocol.

Applications subsystem 510 may include software such as PPM 70 and OS power manager 94 for managing power in processing system 500. Applications subsystem 510 may also include a hardware abstraction layer (HAL) and various communications device drivers, such as power management IC (PMIC), audio, universal serial bus (USB), and MSL device drivers. The communications device drivers may operate as clients of PPM 70 and/or OS power manager 94, and those device drivers may receive notifications from PPM 70 and/or OS power manager 94 on appropriate state transitions. For example, when the OS goes into the standby mode, OS power manager 94 may notify one or more of the communications drivers about this state change. In response, communications subsystem 540 may enter a low power standby state, and, in conjunction with entering that state, may prepare itself for waking up applications subsystem 510, in case communications subsystem 540 subsequently transitions into a new state that requires processing on applications subsystem. 510. Communications between applications subsystem 510 and communications subsystem 540 may transpire as signaling events over a communications path such as MSL 550, general purpose I/O (GPIO) pins, or any other suitable path.

For dynamic performance and power scaling such as that described below, PPM 70 may also notify communications subsystem 540 about frequency and/or voltage changes via a communications device driver such as the MSL driver. CPMM 520 may then notify the communications software accordingly, thereby increasing the effectiveness of the power management approach, relative to a system that does not notify its communications subsystem regarding one or more types of power or performance changes in the applications subsystem. Thus, dynamic, system-level power management may be achieved, rather than simply application-level or communications-level power management.

Figure 4:
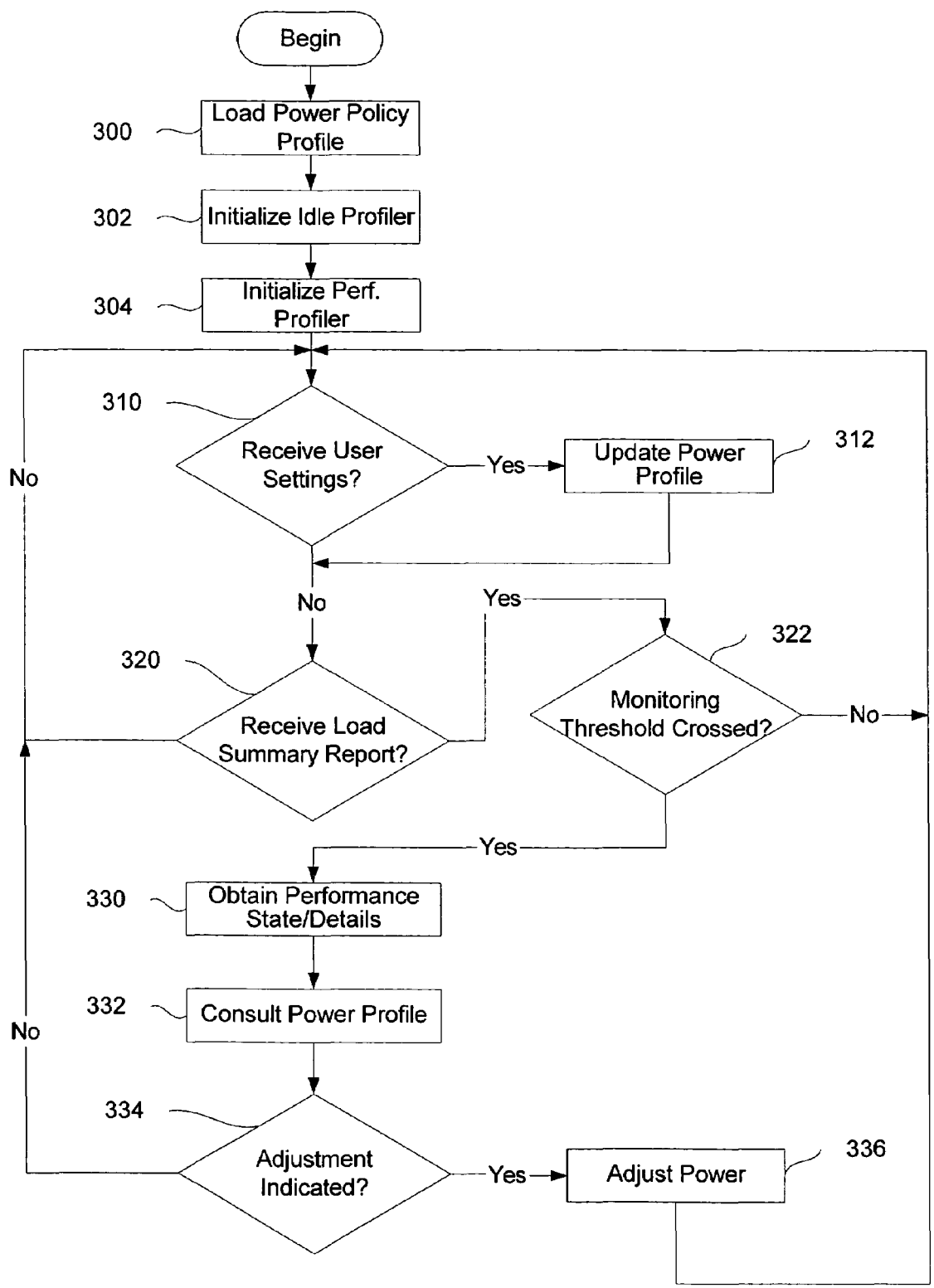
FIG. 4 is a flowchart of a process for managing power in a processing system, in accordance with an example embodiment of the present invention.

FIG. 4 is a flowchart of a process for managing power in a system such as processing system 20, in accordance with an example embodiment of the present invention. When processing system 20 boots, processing system 20 may automatically load PPM 70. As indicated at block 300, one of the first things PPM 70 may do is to load a power policy profile 82 into policy manager 80 from nonvolatile storage, such as ROM 28 or ROM 29, for example. Power policy profile 82 may include various configuration settings for various components of PPM 70, such as an initial sampling period and one or more processor utilization thresholds for idle profiler 74, one or more performance thresholds for policy manager 80 and/or performance profiler 76, and one or more policy entries that may link certain operating states with corresponding platform reconfiguration directives, as described in greater detail below. Power policy profile 82 may represent or encode an overall power management policy for processing system 20.

Each of the configuration settings may be provided with PPM 70 as default value, or may be supplied or modified by a user such as a vendor, a system administrator, an end user, etc. Thus, as described below, PPM 70 may receive a user specified policy setting for processing system 20, and may update power policy profile 82, based at least in part on that policy setting. In one embodiment, some or all of the values in power policy profile 82 are developed through experimentation for a particular hardware configuration, OS, and typical workload. Experimentation may be used to develop suitable values for other hardware configurations, OSs, and workloads.

As depicted at block 302, PPM 70 may then configure idle profiler 74 with processor utilization thresholds for idle profiler 74 to use in determining whether or not to report processor utilization to policy manager 80. These processor utilization thresholds may also be referred to as reporting thresholds. In one embodiment, reporting thresholds may be set at 15%, 45%, and 80% processor utilization, to establish the following steps or zones between the thresholds: 0-15% CPU utilization; 15-45% CPU utilization; 45-80% CPU utilization; and 80-100% CPU utilization. Accordingly, whenever processor utilization moves from one step to another, idle profiler 74 may report the new level of processor utilization to policy manager 80. Other thresholds may be used in alternative embodiments. For instance, a single threshold may be set at 80% CPU utilization.

PPM 70 may then complete the initialization of idle profiler 74 by launching idle profiler 74. The process of launching idle profiler 74 may include the operation of associating a callback routine with idle path 98 of OS 90. A hardware abstraction layer (HAL) or any other suitable technique may be used to associate idle profiler 74 with idle execution path 98. For instance, PPM 70 may insert the callback routine into an interrupt service routine (ISR) associated with entering and/or exiting the processor idle mode. The callback routine may then collect idle time data whenever OS 90 enters and exits idle execution path 98, as described below. Since the callback routine is intimately involved in collecting the idle statistics, the callback routine may be considered part of idle profiler 74. Idle profiler 74 may also be referred to as an idle thread profiler 74.

Idle profiler 74 may set a sampling period, for example based on a default or user defined setting. Idle profiler 74 may then collect idle task data by aggregating the idle time data collected by the callback routine over that sampling period. The sampling period may include one or more time periods spent by the processor in the idle power mode. That is, idle execution path 98 may be executed more than once during a single sampling period.

After expiration of each sampling period, idle profiler 74 may automatically calculate idle statistics by calculating processor utilization for the sampling period, based on the aggregate idle time data. In the example embodiment, idle profiler 74 calculates the idle statistics as close to the end of the window as practical, to ensure that timely statistics are generated. For instance, idle profiler 74 may use code installed in an ISR to calculate the idle statistics. Different approaches may be used for different OSs.

Idle profiler 74 may then automatically determine whether processor utilization has crossed a reporting threshold. If processor utilization has crossed a reporting threshold, idle profiler 74 may automatically report the current processor utilization to policy manager 80. For instance, processor utilization may have been 40% for one sampling period and then 55% for the next. Since a change from 40% to 55% crosses the 45% threshold, idle profiler 74 may report the current processor utilization of 55% to policy manager 80.

However, if processor utilization has not crossed any reporting thresholds, idle profiler 74 may automatically adjust the size of the sampling period. For purposes of this disclosure, the length of the sampling period may also be referred to as the window size.

For example, the callback routine may implement logic such as that summarized in the following pseudo-code:
1. (enter the idle task;)
2. store the idle start time;
3. enter processor idle power mode;
4. exit processor idle power mode;
5. store idle stop time;
6. calculate time spent in processor idle;
7. aggregate with time spent in processor idle for any previous executions of the idle task within the current sampling window;
8. (exit the idle task;)

Idle profiler 74 may implement logic for calculating processor utilization, based on the collected idle statistics, upon expiration of the sampling period. The following pseudo-code summarizes one possible routine for implementing such logic:
1. (window time elapses;)
2. calculate the total elapsed time for the current sampling window, based on the window start time and the current time
3. calculate the current CPU utilization as a percentage, based on the aggregate time spent in idle, divided by the total elapsed time for the sampling window;
4. if the current processor utilization percentage crosses a reporting threshold,
5. report to the policy manager;
6. else
7. expand the window size
8. store new window start time;

Thus, PPM 70 may automatically adjust the sampling period, based at least in part on a comparison of a current performance characteristic and a previous performance characteristic. For instance, idle profiler 74 may determine whether processor utilization during a current sampling period substantially matches processor utilization for a preceding sampling period, and may automatically increase the sampling period in response to a determination that processor utilization during the current sampling period substantially matches processor utilization for the preceding sampling period. Idle profiler 74 may determine that the current metric for processor utilization does not substantially match the previous metric if the current and previous metrics fall on opposite sides of a predetermined reporting threshold.

In one embodiment, the initial window size may be 10 microseconds (ms), and the maximum window size may be 640 ms. Different initial and maximum sizes may be used in alternative embodiment. In other embodiments, a static window size may be used. The static window size may be a default window size set, or it may be specified by a user. For example, a constant sampling period of 100 ms may be used.

Figure 5:
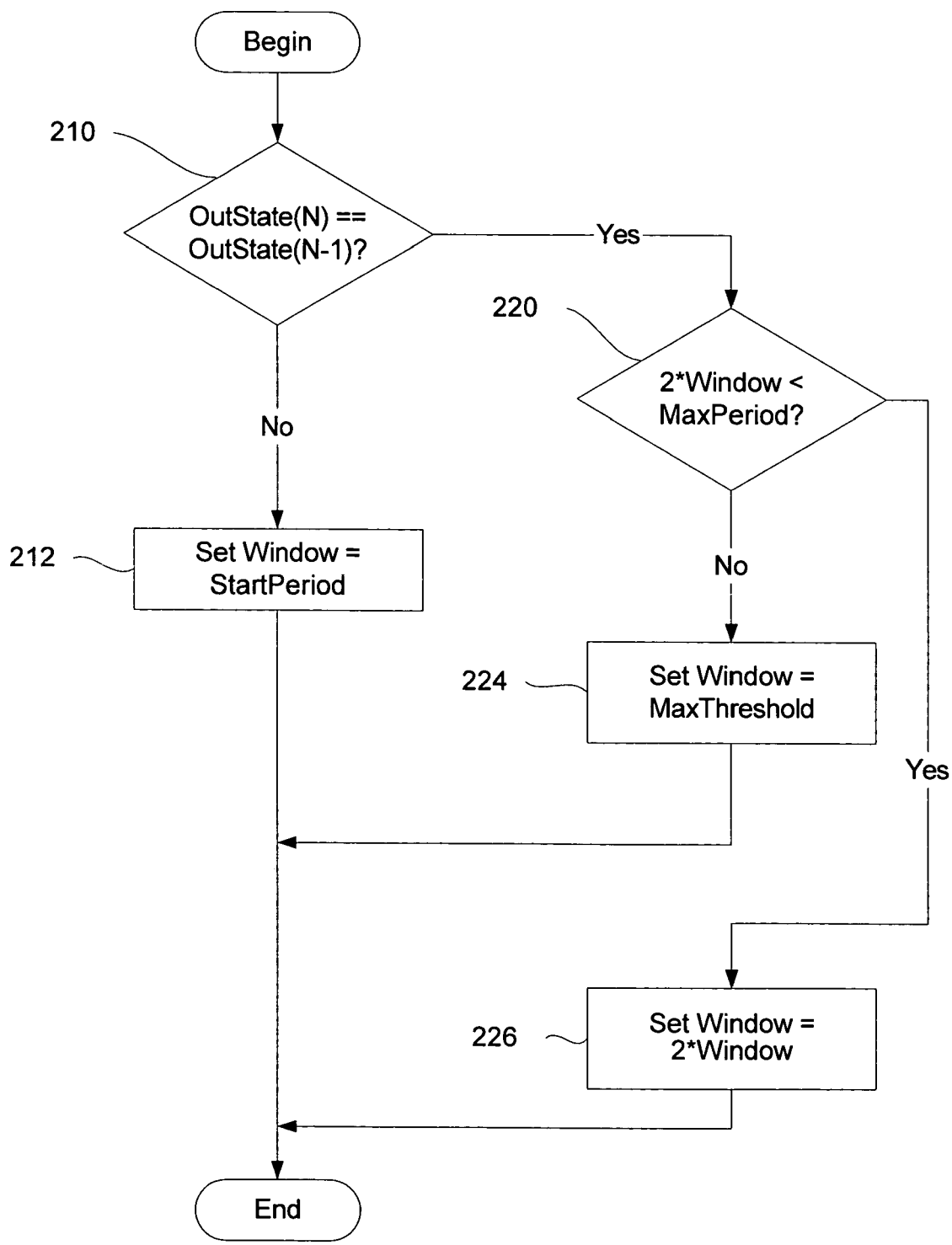
FIG. 5 is a flowchart of a process for dynamically adjusting a monitoring window, in accordance with an example embodiment of the present invention.

FIG. 5 is a flowchart of a process for dynamically adjusting a monitoring window, in accordance with an example embodiment of the present invention. The process may be invoked by PPM 70 or idle profiler 74 to set an initial sampling period, or by idle profiler 74 to adjust the sampling period, as mentioned above. At block 210 of the illustrated process, idle profiler 74 determines whether the processor utilization for the current sampling period (i.e., the sampling period that just ended) is substantially equal to the processor utilization for the previous sampling period. In one embodiment, as indicated above, two sampling periods may be considered to have substantially equal processor utilization if processor utilization for both periods falls within the same zone or step in the schedule of reporting thresholds. In alternative embodiments, the idle profiler may determine that the current metric substantially matches the previous metric if the two metrics differ by less than a predetermined amount, such as 5% for example.

For the initial call, this determination may be negative, due to a lack of processor utilization data for a previous sampling period. If the determination is negative, idle profiler 74 may set the sampling period to an initial size, as indicated at block 212, and the process may then end.

If the determination at block 210 is positive, idle profiler 74 may determine whether the sampling period can be doubled without exceeding the predetermined maximum window size, as depicted at block 220. If doubling the window size would exceed the maximum size, the sampling window may be set to the maximum size, as indicated at block 224. Otherwise, the sampling period may be doubled, as depicted at block 226.

Referring again to FIG. 4, as shown at block 304, PPM 70 may also initialize performance profiler 76 with one or more settings or thresholds from power policy profile 82. For example, PPM 70 may provide performance profiler 76 with a table of performance parameters for different aspects of system performance (e.g., processor utilization statistics and memory utilization statistics) and corresponding system state values, such as idle, memory bound, processor bound, or both processor and memory bound. Such performance parameters may also be referred to as performance thresholds. Table 1 below illustrates some example performance thresholds.

TABLE 1

Performance Profiler Parameters

| CPU Utilization | Memory Statistic | State of System | Policy | Example Workloads |
|---|---|---|---|---|
| IPC < 0.5 | % Data Cache Misses < 10% | Idle | Lower Core Freq. and System Bus (PX) Freq. | System Idle |
| IPC < 0.5 | % Data Cache Misses > 10% | Memory Bound | Increase PX Freq. and Memory (SDClk) Freq. | Memcpy |
| IPC > 0.5 | % Data Cache Misses < 10% | CPU Bound | Increase Core Freq. | Dhrystone |
| IPC > 0.5 | % Data Cache Misses > 10% | Memory & CPU Bound | Increase Core Freq., PX Freq., and SDClk Freq. | Video Application |

As described in greater detail below, the third and fourth columns of Table 1 may represent data in a power policy profile for managing the power consumption of processing system 20. In one embodiment, the term PX frequency may refer to the frequency of a peripheral bus of a processor with Intel XScale® technology, and the SDClk frequency may refer to the frequency of a single data rate dynamic RAM (DRAM) clock. As described below, other embodiments may use other types of policy profiles, such as policy profiles to adjust other types of components in other types of processors, for instance.

In one embodiment, PPM 70 loads performance thresholds and corresponding system state values such as those depicted in the first three columns of Table 1 into performance profiler 76. Performance profiler 76 may use that data to determine the system state to report to policy manager 80 when appropriate, as described in greater detail below.

Once performance profiler 76 has received configuration settings from PPM 70, performance profiler 76 may configure PMU 30 to read and count particular types of events. In the example embodiment, PMU 30 supports collection of twelve different core metrics and various other metrics for events such as liquid crystal display (LCD) activity and direct memory access (DMA) activity. Performance profiler 76 may configure PMU 30 to collect any desired subset of those metrics. For example, in one embodiment, performance profiler 76 configures PMU 30 to collect at least the following four metrics: instructions executed (PMU event number 0x7), data cache (DCache) misses (PMU event number 0xB), DCache accesses (PMU event number 0xA), and data dependency stalls (0x8).

At block 310 of FIG. 4, after performance profiler 76 has been initialized, policy manager 80 may determine whether it has received user specified power management settings from user settings interface 72. For instance, a user may specify new values to be added to power policy profile 82, or modifications to existing values for any suitable field in power policy profile 82, such as an initial sampling period, any of the various threshold values, system states, etc. If a user setting has been received, PPM 70 may update power policy profile 82, as indicated at block 312.

As depicted at block 320, policy manager 80 may then determine whether it has received a summary load report from idle profiler 74. In the example embodiment, a summary load report may be a communication from idle profiler 74 reporting that processor utilization has crossed a reporting threshold, as indicated above. The summary load report may specify the current processor utilization percentage, as measured by idle profiler 74.

If no report has been received, policy manager 80 may discontinue processing until such a report is received or new settings are received from a user, as indicated by the arrow returning to block 310. However, if a summary load report has been received, PPM 70 may, in response, automatically determine whether additional performance data should be collected, as depicted at block 322. That determination may be based at least in part on a predetermined monitoring policy for the processing system. For instance, the monitoring policy may specify one or more monitoring thresholds, and policy manager 80 may determine whether the reported processor utilization crosses one of the monitoring thresholds. For instance, the monitoring policy may define a monitoring threshold at 80% processor utilization, and policy manager 80 may collect additional metrics only if the reported processor utilization has reached or exceeded that threshold.

If no monitoring threshold has been crossed, policy manager 80 may discontinue processing until another load report is received from idle profiler 74 or new policy settings are received from a user, as indicated by the arrow returning to block 310. However, if a monitoring threshold has been crossed, policy manager 80 may call performance profiler 76 to obtain one or more metrics for the current system state, as indicated at block 330.

In the example embodiment, when performance profiler 76 is called, it obtains detailed performance data from PMU 30. That data may include, for example the metrics referenced above with regard to PMU 30. In the example embodiment, PMU 30 provides accurate characterization of the current system loading. Different mechanisms may be used to obtain the detailed performance data in different embodiments. For example, one set of functions may be used for platforms with one OS, and a different set of functions may be used for platforms with a different OS. In the example embodiment, for each instance of PMU data sampling, the PMU counters may be reset at the start of the window, so the statistics for that window will be based on counters which update starting from zero.

After collecting the detailed performance data, performance profiler 76 may generate processor performance statistics and memory performance statistics, based on the collected data. For example, performance profiler 76 may calculate an average number of instructions executed per cycle (IPC), for the period since performance profiler 76 was last called, by dividing the number of instructions executed, by a product of the current processor frequency and the length of time since the last call to performance profiler 76. Performance profiler 76 may also calculate the percentage of cache misses for the same period, for example by dividing the number of data cache misses by the number of data cache accesses, and multiplying the result by 100. The memory performance statistics may also be considered memory efficiency statistics. The processor and memory performance statistics may be referred to in general as architectural statistics.

In the example embodiment, idle profiler 74 uses a dynamically adjusted sampling window, and performance profiler 76 responds to requests from policy manager 80. In alternative embodiments, performance profiler 76 may instead also use the sampling window used by idle profiler 74. Accordingly, performance profiler 76 may use the length of that sampling window as the relevant time metric when calculating statistics such as IPC.

After generating the architectural statistics, performance profiler 76 may consult a performance profile such as the one illustrated above in Table 1 to assign a particular system state metric with the calculated statistics. For instance, in one embodiment, performance profiler 76 may assign a system state of "idle" when the calculated statistics include IPC less then 0.5 and a data cache miss percentage less than 10%. (As indicated above, the threshold metrics of 0.5 IPC and 10% data cache misses may be developed for a particular type of processing system and OS.) Performance profiler 76 may then report the system state to policy manager 80.

Thus, in the example embodiment, performance profiler 76 may generate performance data that identifies a current performance state of processing system 20 as an idle state, a memory bound state, a processor bound state, or a memory bound and processor bound state. Performance profiler 76 may report the current performance state to policy manager 80.

Policy manager 80 may then consult a policy profile to determine an appropriate policy to be implemented, based on the reported system state, as indicated at block 332 and 334. The policy profile may contain predetermined policy entries which associate different performance metrics or performance states with corresponding platform reconfiguration directives. Such a policy profile may include data such as that shown in columns 3 and 4 of Table 1, for example. This policy profile may be implemented as part of power policy profile 82, for instance.

If the policy profile indicates that no changes should be made to the current platform configuration, policy manager 80 may discontinue operation until the next load report is received or new policy settings are received from a user, as indicated by the arrow returning to block 310. However, as indicated at block 336, if the policy profile indicates that operating parameters of processing system 20 should be reconfigured, PPM 70 may automatically use PMU 30 to adjust power consumption of processing system 20 in accordance with the pertinent platform reconfiguration directive or directives from power policy profile 82.

For example, policy manager 80 may reconfigure processing system 20 by performing one or more of the following operations:

reducing an operating voltage of processing core 24 in processor 22;

reducing an operating frequency of processing core 24 in processor 22;

reducing an operating voltage of memory controller 38 in processor 22;

reducing an operating frequency of memory controller 38 in processor 22;

increasing an operating voltage of processing core 24 in processor 22;

increasing an operating frequency of processing core 24 in processor 22;

increasing an operating voltage of memory controller 38 in processor 22; and increasing an operating frequency of memory controller 38 in processor 22.

Additionally, power policy profile 82 may include directives for increasing and decreasing operating frequencies and/or operating voltages of one or more buses, such as system bus 40 in processor 22, external memory bus 44, etc. Policy manager 80 may use the PMU device driver from among device drivers 100 to apply the suitable reconfiguration directive or directives.

Table 1 and the above description refer to policies for reducing or increasing various frequencies. In some embodiments, the platform reconfiguration directives may specify particular frequencies to be set in particular circumstances. For example, the following table represents entries in a power policy profile for one embodiment, with predetermined actions to be implemented in response to detection of predetermined processor utilization metrics.

TABLE 2

Alternative Platform Reconfiguration Directives

| Threshold | Action |
|---|---|
| 0-15% CPU | Set system bus frequency to 100 MHz |
| 15-45% CPU | Set system bus frequency to 200 MHz |
| 45-80% CPU | Set system bus frequency to 300 MHz |
| 80-100% CPU | Set system bus frequency to 400 MHz |

In some embodiments, the policy manager 80 may reconfigure the power consumption of the processing system in response to processor utilization data from an idle profiler, without necessarily also retrieving detailed performance data from a PMU.

Furthermore, in some embodiments, in addition to providing for automatic power management based on input from one or more profilers, policy manager 80 may provide for manual overrides. For instance, policy manager 80 may provide an interface for receiving a directive from the user to keep the system running in a particular operating mode or at a set frequency for set amount of time. The user may set the mode/frequency and duration via a user interface setting. The input may go directly to policy manager 80, which may, in response, configure the operating parameters of processing system 20 accordingly.

For example, when the user desires to listen to music for half an hour, the user may provide input to instruct processing system 20 to go into an MP3 (Moving Picture Experts Group Layer-3 Audio) mode for 30 minutes. Alternatively, when the user does not plan to use telephony features for two hours, the user may instruct processing system 20 to shut off telephony components in processing system 20 for two hours. In response, policy manager may configure processing system 20 to utilize appropriate frequencies and power levels, according to the user directives. Policy manager 20 may also cause processing system 20 to suspend performance monitoring and profiling for the specified time period.

In the example embodiment, the operations for collecting idle time data, calculating processor utilization percentage, obtaining performance data from PMU 30, and calculating system state are performed in a kernel mode of operating system 90. Kernel mode may provide the least latency and the most accurate utilization statistics, and kernel mode may provide components such as performance profiler 76 with access to kernel services and components. Nevertheless, in alternative embodiments, one or more of those operations may be performed partially or completely within a user mode of OS 90. In such embodiments, the PMU driver may export the driver interface directly or indirectly, such as through I/0 control (IOCTL) calls, to minimize the latency for handling PMU events.

In the example embodiment, policy manager 80 may analyze the data from performance profiler 76 and reconfigure processing system 20 in a user mode of OS 90. In alternative embodiments, one or more of those operations may be performed at least partially in kernel mode.

Through operations and mechanisms such as those described above, idle profiler 74 dynamically calculates processor utilization information based on system idle, and provides that information to policy manager 80. Policy manager 80 may use that intelligent idle profiling input to derive the current operating points of the processing system (e.g., the current utilization statistics for the system's processing resources ) and the current operating state of the system (e.g., which processing resources, if any, are limiting the system's performance). Policy manager 80 may then dynamically set system parameters to increase or decrease the performance of one or more processing resources to more efficiently meet the performance demands of the current workload. Processor utilization information may thus be used to adaptively manage power consumption by dynamically setting optimal system parameters and operating states, based on dynamic performance demands. Idle profiler 74 thus provides an algorithm, based on system idle, that may perform dynamic characterization of a processing system running an OS, to help enable accurate and efficient setting of parameters such as frequency and voltage, to make new low power modes available, and to save power while providing optimal system performance. In short, the methods and mechanisms disclosed herein support dynamic power and performance scaling, based on actual system workload.

Since PPM 70 may dynamically detect different types of workloads, based on the actual, measured, current performance characteristics, and may scale power consumption based on the current characteristics, PPM 70 provides an adaptive power management system.

The disclosed embodiments do not rely on task based scheduler information, but instead provide dynamic power performance scaling. This power scaling may be achieved without any static task schedule information. Instead, the processing system may be automatically configured into different operating points with different levels of power consumption, based on dynamically detected performance states and corresponding profile settings.

Furthermore, the present invention is not limited to a particular OS, but may be deployed in processing systems that use a wide variety of different OSs.

In addition, the above teachings may be used to take advantage of various low power modes that may be supported by the system's hardware (e.g., various power modes supported by a processor), even when those modes are not supported by the system's OS. For example, the processors in the Intel® PXA26x and the Intel® PXA27x processor families include technologies for performance switching. Similar technologies are included in various mobile processors distributed by Intel Corporation, such as the type of processor referred to as Mobile Intel® Pentium® III Processor-M. The technologies for performance switching included on those processors may be referred to in general as Intel SpeedStep® technology. Embodiments of the present invention may be used to more effectively exploit the power saving possibilities that such technologies support. Alternative embodiments may be used to enhance the efficiency of processing systems that use other kinds of processors, including processor that use other kinds of performance or power management technologies.

Figure 6:
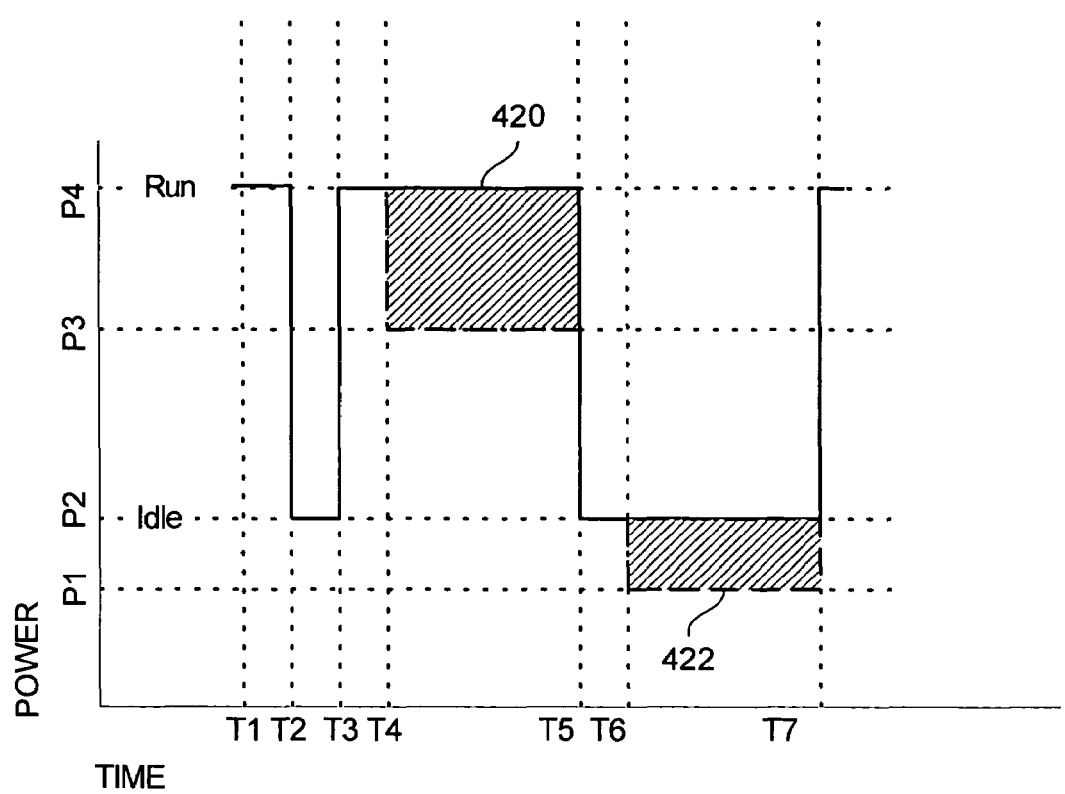
FIG. 6 is a bar graph depicting different levels of power consumption over time in a processing system according to an example embodiment of the present invention.

FIG. 6 is a bar graph depicting examples of some of the different levels of power consumption over time in processing system 20. For instance, at time T1, processing system 20 may be operating at power level P4. In the example embodiment, power level P4 represents the level of power consumption when processing system 20 is in a conventional run mode of OS 90. OS 90 may then transition processing system 20 into a conventional idle mode in response to detecting that there are no more tasks of work to schedule. When OS 90 transitions processing system 20 to idle mode, the level of power consumption may be reduced to level P2, as illustrated beginning at time T2. OS 90 may subsequently transition processing system 20 back into the run mode to performance additional work, as illustrated starting at time T3.

At time T4, policy manager 80 may reconfigure processing system 20 to consume power at a level less than the level associated with conventional run mode, and greater than then level associated with conventional idle mode, such as a power level P3. In certain circumstances, the time between T3 and T4 may correspond to the sampling period of idle profiler 74. When processing system 20 is configured to operate at power level P3, processing system 20 may be said to be operating in a "run minus 1" or a "run–1" mode.

At time T5, processing system 20 may transition back to idle mode, for instance in response to OS 90 determining that there are no more tasks to schedule. At time T6, policy manager 80 may reconfigure processing system 20 to consume power at a level less than the level associated with conventional idle mode, such as a power level P1. In some circumstances, the time between T5 and T6 may correspond to the sampling period of idle profiler 74. When processing system 20 is configured to operate at power level P1, processing system 20 may be said to be operating in an "idle minus 1," an "idle−1" mode, or an "ultra low power mode." Thus, areas 420 and 422 represent power savings realized through adaptive power and performance scaling according to the present disclosure.

In some embodiments, policy manager 80 and power policy profile 82 may provide for multiple "run−X" and/or multiple "idle−X" modes. Each of those modes may be considered an operating power state. PPM 70 may thus be said to create or provide for multiple new operating power states, by mapping those states to available low power modes of processors such as processor 22 and/or a communications or baseband processor within communications subsystem 540. Unlike with application-level power management, PPM 70 may provide for seamless power management, where power management events are handled without no significant performance or latency impact.

PPM 70 may extend the state machine provided by OS 90 for additional low power states. In some embodiments, PPM 70 operate at a lower logical level than OS 90, to transition processing system 20 into these new states without any direction from OS 90 regarding such transitions.

In the example embodiment, policy manager 80 reconfigures processing system into low power modes such as run−1 and idle−1 in response to determining that the current performance requirements can be accommodated in an operating mode with reduced power consumption. Policy manager 80 may make those determinations, based on performance data received from performance profiler 76, and based on power policy profile 82, as indicated above. Specifically, policy manager 80 may cause processing system 20 to enter run−1 or idle−1 mode by using PMU 30 to reconfigure processing system 20 according to a particular platform reconfiguration directive from power policy profile 82. That platform reconfiguration directive may be the directive associated with the performance data or performance metrics received from performance profiler 76.

Policy manager 80 thus dynamically sets the system's operating points in the run mode to increase power efficiency when processor 22 is doing work, and also in the idle mode to increase power efficiency when processor 22 is idle. In the example embodiment, processor 22 supports numerous different operating frequencies, from as low as 13 megahertz (MHz) TO 800 MHz, for instance. In other embodiments, other ranges of operating frequencies may be used.

It may be noted that, during idle mode, policy manager 80 may continue to monitor processor utilization and collect statistics. In ultra low power mode, policy manager 80 may stop the profilers. However, policy manager 80 may remain active, waiting for wakeup events that bring processing system 20 out of ultra low power mode. Once the processor comes out of the ultra low power mode, policy manager 80 may restart the profilers and continue enforcement of the power policy. For instance, if processing system 20 has been operating under a minimum threshold (e.g., 20% processor utilization) for a predetermined time period (e.g., over five minutes), policy manager 80 may stop the profilers, shut down various system components, and transition processing system 20 into ultra low power mode. Policy manager 80 may then restart the profilers in response to a wakeup event, such as a press key, an incoming call, etc.

Referring again to FIG. 2, PPM 70 also supports application-level power management, for example through one or more power management applications 68. For instance, a multimedia application can call PPM 70 to scale power and performance in anticipation of expected performance needs. PPM 70 may ultimately pass such calls to a bus or interface such as a power inter-integrated circuit (P12C) interface of processing system 20 to utilize the DVM/DFM capabilities of processor 22. Thus, in addition to the power savings provided by automatic power management at the platform or system level, processing system 20 may obtain power savings from explicit application-level directives.

In light of the principles and example embodiments described and illustrated herein, it will be recognized that the illustrated embodiments can be modified in arrangement and detail without departing from such principles. For instance, although one or more example embodiments have been described, for purposes of illustration, with regard to a battery powered device such as a cellular telephone, PDA, laptop computer, tablet computer, or other portable processing system, the present invention is not limited to utilization in such systems, but may also be used to advantage in many other types of systems, such as desktop computers, servers, etc. Accordingly, although one of the primary benefits for some implementations or embodiments of the invention may be extended battery life, other benefits may be more important in other implementations or embodiments. For example, noise and heat reductions may be the primary benefits in some implementations or embodiments, and reduced energy costs may be a primary benefit in other implementations or embodiments.

In addition, although the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, it will be apparent to those of ordinary skill in the art that numerous modifications to the processes could be applied to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, DVDs, ROM, and RAM; as well as communications media such antennas, wires, optical fibers, microwaves, radio waves, and other electromagnetic or optical carriers. Accordingly, instructions and other data may be delivered over transmission environments or networks in the form of packets, serial data, parallel data, propagated signals, etc., and may be used in a distributed environment and stored locally and/or remotely for access by single or multiprocessor machines.

It should also be understood that the hardware and software components depicted herein represent functional elements that are reasonably self contained so that each can be designed, constructed, or updated substantially independently of the others. In alternative embodiments, many of the components may be implemented as hardware, software, or combinations of hardware and software for providing the functionality described and illustrated herein.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope and spirit of the following claims and all equivalents to such implementations.

What is claimed is:

1. A method comprising:
    initializing a performance profiler of a processing system, the performance profiler to comprise performance profile parameters for a power management policy for the processing system;
    determining that performance details for the processing system should be collected;
    in response to determining that performance details should be collected, retrieving performance metrics for the processing system from a performance monitoring unit (PMU) of the processing system;
    determining a current performance state of the processing system, based at least in part on the performance profile parameters and the performance metrics from the PMU, wherein the operation of determining a current performance state of the processing system comprises generating performance data that identifies a state of the processing system from the group consisting of:
        an idle state;
        a memory bound state;
        a processor bound state; and
        a memory bound and processor bound state; and
    communicating the current performance state to a policy manager of the processing system, the communicated performance state to comprise the performance data that identifies the state of the processing system.

2. A method according to claim 1, wherein:
    the operation of determining a current performance state of the processing system comprises determining whether the performance metrics correspond to a memory bound performance state; and
    the operation of communicating the current performance state to the policy manager comprises reporting the memory bound performance state to the policy manager in response to a determination that the performance metrics correspond to the memory bound performance state.

3. A method according to claim 2, wherein:
    the performance profile parameters comprise a predetermined memory utilization threshold; and
    the performance profiler determines whether the performance metrics correspond to the memory bound performance state, based at least in part on the predetermined memory utilization threshold.

4. A method according to claim 1, wherein:
    the operation of determining a current performance state of the processing system comprises determining whether the performance metrics correspond to a processor bound performance state; and
    the operation of communicating the current performance state to the policy manager comprises reporting the processor bound performance state to the policy manager in response to a determination that the performance metrics correspond to the processor bound performance state.

5. A method according to claim 4, wherein:
    the performance profile parameters comprise a predetermined processor utilization threshold; and
    the performance profiler determines whether the performance metrics correspond to the processor bound performance state, based at least in part on the predetermined processor utilization threshold.

6. A method according to claim 1, wherein:
    the operation of retrieving performance metrics from the PMU comprises retrieving a count of cache accesses for the processor, and a count of cache misses for the processor; and
    the operation of determining a current performance state of the processing system comprises determining whether the performance metrics correspond to a memory bound performance state, based at least in part on the count of cache accesses and the count of cache misses.

7. A method according to claim 1, wherein the operation of determining a current performance state of the processing system comprises:
    determining the current performance state of the processing system, based at least in part on a measure of a sampling period for evaluating operating attributes of the processing system.

8. A method according to claim 1, wherein:
    the operation of retrieving performance metrics from the PMU comprises receiving, from the PMU, a count of instructions executed by a processor of the processing system; and
    the method further comprises:
    determining a current frequency for the processor; and
    calculating an average number of instructions executed per cycle of the processor (average IPC), based at least in part on the count of instructions executed and the current frequency of the processor.

9. A method according to claim 1, further comprising:
    before retrieving the performance metrics from the PMU, configuring the PMU to collect the performance metrics.

10. A method according to claim 1, wherein the operation of determining that performance details should be collected comprises:
    receiving notification from the policy manager that performance details should be collected.

11. A method according to claim 1, further comprising:
    determining whether the processing system should be reconfigured, based at least in part on the current performance state reported by the performance profiler, and a power policy profile for the processing system, wherein the power policy profile comprises predetermined policy entries which associate different performance states with corresponding platform reconfiguration directives; and
    in response to a determination that the processing system should be reconfigured, automatically adjusting power consumption of the processing system.

12. A method according to claim 10, wherein the operation of automatically adjusting power consumption of the processing system comprises:
    using the PMU to reconfigure the processing system.

13. An apparatus comprising:
    a storage medium; and
    instructions encoded in the machine accessible medium, wherein the instructions, when executed in a processing system, cause the processing system to perform operations comprising:

initializing a performance profiler of the processing system, the performance profiler to comprise performance profile parameters for a power management policy for the processing system;

determining that performance details for the processing system should be collected;

in response to determining that performance details should be collected, retrieving performance metrics for the processing system from a performance monitoring unit (PMU) of the processing system;

determining a current performance state of the processing system, based at least in part on the performance profile parameters and the performance metrics from the PMU, wherein the operation of determining a current performance state of the processing system comprises generating performance data that identifies a state of the processing system from the group consisting of:
an idle state;
a memory bound state;
a processor bound state; and
a memory bound and processor bound state; and communicating the current performance state to a policy manager of the processing system, the communicated performance state to comprise the performance data that identifies the state of the processing system.

14. An apparatus according to claim 13, wherein:
the instructions to determine the current performance state comprise instructions to determine whether the performance metrics correspond to a memory bound performance state; and
the instructions to communicate the current performance state to the policy manager comprise instructions to report the memory bound performance state to the policy manager in response to a determination that the performance metrics correspond to the memory bound performance state.

15. An apparatus according to claim 14, wherein:
the performance profile parameters comprise a predetermined memory utilization threshold;
the instructions comprise software to implement a performance profiler; and
the performance profiler determines whether the performance metrics correspond to the memory bound performance state, based at least in part on the predetermined memory utilization threshold.

16. An apparatus according to claim 13, wherein:
the instructions to determine the current performance state comprise instructions to determine whether the performance metrics correspond to a processor bound performance state; and
the instructions to communicate the current performance state to the policy manager comprise instructions to report the processor bound performance state to the policy manager in response to a determination that the performance metrics correspond to the processor bound performance state.

17. An apparatus according to claim 16, wherein:
the performance profile parameters comprise a predetermined processor utilization threshold;
the instructions comprise software to implement a performance profiler; and
the performance profiler determines whether the performance metrics correspond to the processor bound performance state, based at least in part on the predetermined processor utilization threshold.

18. An apparatus according to claim 13, wherein:
the instructions to retrieve performance metrics from the PMU comprise instructions to retrieve a count of cache accesses for the processor, and a count of cache misses for the processor; and
the instructions to determine a current performance state of the processing system comprise instructions to determine whether the performance metrics correspond to a memory bound performance state, based at least in part on the count of cache accesses and the count of cache misses.

19. An apparatus according to claim 13, wherein the instructions determine that performance details should be collected in response to receiving notification from the policy manager that performance details should be collected.

20. An apparatus according to claim 13, wherein the storage medium further comprises:
instructions to determine whether the processing system should be reconfigured, based at least in part on the current performance state and a power policy profile for the processing system, wherein the power policy profile comprises predetermined policy entries which associate different performance states with corresponding platform reconfiguration directives; and
instructions to automatically adjust power consumption of the processing system, in response to a determination that the processing system should be reconfigured.

21. A processing system comprising:
a performance monitoring unit (PMU);
a machine accessible medium;
a processor responsive to the PMU and the machine accessible medium; and
instructions encoded in the machine accessible medium, wherein the instructions, when executed by the processor, perform operation comprising:
initializing a performance profiler of the processing system, the performance profiler to comprise performance profile parameters for a power management policy for the processing system;
determining that performance details for the processing system should be collected;
in response to determining that performance details should be collected, retrieving performance metrics for the processing system from a performance monitoring unit (PMU) of the processing system;
determining a current performance state of the processing system, based at least in part on the performance profile parameters and the performance metrics from the PMU, wherein the operation of determining a current performance state of the processing system comprises generating performance data that identifies a state of the processing system from the group consisting of:
an idle state;
a memory bound state;
a processor bound state; and
a memory bound and processor bound state; and
communicating the current performance state to a policy manager of the processing system, the communicated performance state to comprise the performance data that identifies the state of the processing system.

22. A processing system according to claim 21, wherein:
the instructions to determine the current performance state comprise instructions to determine whether the performance metrics correspond to a memory bound performance state; and
the instructions to communicate the current performance state to the policy manager comprise instructions to report the memory bound performance state to the policy manager in response to a determination that the performance metrics correspond to the memory bound performance state.

23. A processing system according to claim 22, wherein:

the performance profile parameters comprise a predetermined memory utilization threshold;

the instructions comprise software to implement a performance profiler; and the performance profiler determines whether the performance metrics correspond to the memory bound performance state, based at least in part on the predetermined memory utilization threshold.

24. A processing system according to claim 21, wherein:

the instructions to determine the current performance state comprise instructions to determine whether the performance metrics correspond to a processor bound performance state; and the instructions to communicate the current performance state to the policy manager comprise instructions to report the processor bound performance state to the policy manager in response to a determination that the performance metrics correspond to the processor bound performance state.

25. A processing system according to claim 24, wherein:

the performance profile parameters comprise a predetermined processor utilization threshold;

the instructions comprise software to implement a performance profiler; and the performance profiler determines whether the performance metrics correspond to the processor bound performance state, based at least in part on the predetermined processor utilization threshold.

26. A processing system according to claim 21, wherein:

the instructions to retrieve performance metrics from the PMU comprise instructions to retrieve a count of cache accesses for the processor, and a count of cache misses for the processor; and the instructions to determine a current performance state of the processing system comprise instructions to determine whether the performance metrics correspond to a memory bound performance state, based at least in part on the count of cache accesses and the count of cache misses.

27. A processing system according to claim 21, wherein the instructions determine that performance details should be collected in response to receiving notification from the policy manager that performance details should be collected.

* * * * *